(12) United States Patent
Jiang et al.

(10) Patent No.: US 12,109,751 B2
(45) Date of Patent: Oct. 8, 2024

(54) HOLLOW BODY FORMING MOLD AND HOLLOW BODY FORMING METHOD

(71) Applicant: YAPP Automotive Systems Co., Ltd., Jiangsu (CN)

(72) Inventors: Lin Jiang, Jiangsu (CN); Songjun Xu, Jiangsu (CN); Dejun Gao, Jiangsu (CN); Jie Li, Jiangsu (CN); Xueji Ge, Jiangsu (CN); Chao Zhang, Jiangsu (CN); Wei Zhou, Jiangsu (CN)

(73) Assignee: YAPP Automotive Systems Co., Ltd., Yangzhou (CN)

( * ) Notice: Subject to any disclaimer, the term of this patent is extended or adjusted under 35 U.S.C. 154(b) by 194 days.

(21) Appl. No.: 17/519,677

(22) Filed: Nov. 5, 2021

(65) Prior Publication Data

US 2022/0055280 A1     Feb. 24, 2022

Related U.S. Application Data

(62) Division of application No. 16/180,874, filed on Nov. 5, 2018, now Pat. No. 11,203,144.

(51) Int. Cl.
*B29C 49/48*     (2006.01)
*B29C 49/18*     (2006.01)
(Continued)

(52) U.S. Cl.
CPC .......... *B29C 49/4817* (2013.01); *B29C 49/18* (2013.01); *B29C 49/20* (2013.01);
(Continued)

(58) Field of Classification Search
CPC ..... B29C 49/4817; B29C 49/18; B29C 49/20; B29C 2049/2008; B29C 2049/2078;
(Continued)

(56) References Cited

U.S. PATENT DOCUMENTS

| | | | | |
|---|---|---|---|---|
| 660,005 A | * | 10/1900 | Davis et al. | B23Q 17/2225 33/635 |
| 3,932,104 A | | 1/1976 | Schneider | |

(Continued)

FOREIGN PATENT DOCUMENTS

| | | | |
|---|---|---|---|
| CN | 202029378 U | * | 11/2011 |
| DE | 102009031441 A1 | | 1/2011 |

(Continued)

*Primary Examiner* — Jacob T Minskey
*Assistant Examiner* — Caroline Beha
(74) *Attorney, Agent, or Firm* — The Webb Law Firm

(57) ABSTRACT

A hollow body forming mold includes left and right half molds, a bottom of the left half mold is provided with a left avoidance slot, a bottom of the right half mold is provided with a right avoidance slot, a left bottom slider is disposed in the left avoidance slot, a right bottom slider is disposed in the right avoidance slot, and the left and right bottom sliders constitute a group of sliders. The mold design resolves a difficult problem that a fabrication hole exists during forming of a hollow body with a built-in component by using an existing conventional process. The hollow body forming method has the advantages of a short forming period, the high production efficiency, good combination between a built-in component and an inner wall of an fuel tank, and the high location stability.

5 Claims, 8 Drawing Sheets

(51) Int. Cl.
 *B29C 49/20* (2006.01)
 *B29L 31/00* (2006.01)
(52) U.S. Cl.
 CPC .............. *B29C 2049/2008* (2013.01); *B29C 2049/2078* (2013.01); *B29L 2031/7172* (2013.01)
(58) Field of Classification Search
 CPC ..... B29C 49/04; B29C 49/16; B29C 49/4247; B29L 2031/7172
 See application file for complete search history.

(56) References Cited

U.S. PATENT DOCUMENTS

| | | | |
|---|---|---|---|
| 6,712,234 | B2 | 3/2004 | Boecker |
| 8,282,875 | B2 | 10/2012 | Roos et al. |
| 8,951,461 | B2* | 2/2015 | Heim .................. B29C 49/4817 425/530 |
| 8,968,634 | B2 | 3/2015 | Lichtenauer et al. |
| 2006/0099294 | A1 | 5/2006 | Netsu |
| 2009/0162472 | A1* | 6/2009 | Aoki .................. B29C 49/4242 425/523 |
| 2011/0262736 | A1 | 10/2011 | Sumi |

FOREIGN PATENT DOCUMENTS

| | | | |
|---|---|---|---|
| EP | 1512516 | A2 | 3/2005 |
| FR | 2915923 | A1 | 11/2008 |

* cited by examiner

HOLLOW BODY FORMING MOLD AND HOLLOW BODY FORMING METHOD

CROSS-REFERENCE TO RELATED APPLICATION

This application is a divisional of U.S. patent application Ser. No. 16/180,874 filed on Nov. 5, 2018, the disclosure of which is hereby incorporated by reference in its entirety.

FIELD OF THE INVENTION

The present invention relates to a forming mold and a hollow body forming method, and specifically, to a hollow body forming mold, and belongs to the field of hollow body production and processing technologies.

BACKGROUND

Related Art

Among the existing hollow body forming technologies, the most advanced one is the two-piece technology. However, due to the relatively high investment costs of device and tooling, the price of plastic fuel tanks manufactured by means of this technology is increased greatly. As a result, main engine plants usually prefer low-cost conventional technologies during manufacturing of economical vehicles. However, as emission regulations of the countries become increasingly demanding, it is very difficult for plastic fuel tanks manufactured by means of conventional technologies, in particular a plastic fuel tank, in which a component such as a baffle is built by means of a conventional technology in the forming process, to meet the demanding emission regulations.

Currently, the forming methods used in this technical field are mainly divided into two types. One type is the forming method described in the patent FR2915923B1 and the patent DE102009031441B4. The advantage of the forming method is that no additional fabrication hole is added to a box body, and the disadvantage of the forming method is that a mold cannot be closed in place at one time, the location of a built-in baffle has a risk of being unstable, and a fixing apparatus in which a built-in component such as the baffle is placed needs to exit before the mold is completely closed. Consequently, the forming period is lengthened, and the production efficiency is reduced.

The other type is the forming method described in the patent U.S. Pat. No. 6,712,234B2. This type of forming method is to integrate a fixing apparatus in which a built-in component such as a baffle is placed onto a blow pin, where a fixing bar runs through a blow hole of the blow pin. In the design of this type of tooling, the fixing bar needs to exit only after high-pressure blowing ends and a mold is opened. Therefore, a fabrication hole is left on a formed product, and a "cap" needs to be sequentially welded to seal the fabrication hole. However, emission after welding is still high relative to the requirements of the current demanding emission regulations. Even if the company provides a compensation scheme in the subsequent patent EP1512516B1, that is, after the high-pressure blowing ends, the fabrication hole is pinched closed by using a pinch plate, because the temperature of a parison at this moment is only 70° C. to 80° C. and the melting point of HDPE is usually approximately 130° C., it is almost impossible for the parison to be completely fusion-welded together by means of pinching in this temperature area. Currently, there is no relatively ideal solution in the prior art. Therefore, there is an urgent need for a new solution to resolve this technical problem.

SUMMARY

The present invention provides a hollow body forming mold in view of the technical problem in the prior art. The technical solution properly resolves the problem in the prior art that the stability of a built-in component of a built-in component is poor in a forming process based on a conventional hollow body forming technology and the forming period is long, or the problem in the prior art that a fabrication hole exists after forming and needs to be subsequently welded and sealed, and emission after welding is still relatively high.

To achieve the foregoing objective, the technical solutions of the present invention are as follows. A hollow body forming mold is provided. The forming mold includes left and right half molds, a bottom of the left half mold is provided with a left avoidance slot, a bottom of the right half mold is provided with a right avoidance slot, a left bottom slider is disposed in the left avoidance slot, a right bottom slider is disposed in the right avoidance slot, and the left and right bottom sliders constitute a group of sliders.

The left and right avoidance slots are symmetrically distributed and have a same width, and the left and right bottom sliders are symmetrically distributed and have a same width.

The left or right bottom slider is a part that constitutes a bottom pinch line of the left or right half mold.

There is only one left or right avoidance slot.

There is at least one left bottom slider and at least one right bottom slider, and only one left bottom slider and one right bottom slider are a part that constitutes a bottom pinch line, the group of sliders is referred to as a first bottom slider, and remaining slider groups can be arranged below the first bottom slider.

The left and right bottom sliders are respectively connected to the left and right half molds of the mold by using a driving apparatus, and the driving apparatus is usually any one of conventional drives such as a hydraulic cylinder, a pneumatic cylinder, and a servo motor.

A hollow body forming method is provided. The method includes the following steps:
- step 1) mounting a built-in component to a lifting apparatus;
- step 2) blanking a parison to a specified location;
- step 3) delivering, by the lifting apparatus, a baffle into a molten cylindrical parison;
- step 4) opening a spreader device to expand the parison;
- step 5) closing a parison closing device to seal the parison;
- step 6) performing preblowing;
- step 7) closing a mold;
- step 8) after the mold is closed in place, lowering the lifting apparatus to outside of the mold;
- step 9) driving, by a driving apparatus, a first bottom slider of the mold to advance in place;
- step 10) performing high-pressure blowing in the mold (parison);
- step 11) after the high-pressure blowing ends, opening the mold, and drawing the first bottom slider of the mold back; and
- step 12) taking, by a mechanical hand, a product out.

In the step 7), the mold is closed in place at one time, and in this process, the first bottom slider of the mold is located at a draw-back location.

In the step 9), after the first bottom slider of the mold advances in place, the bottom slider is integrated with a bottom pinch line, to completely seal a mold cavity of the mold; in addition, an advancement process of the first bottom slider has a function of pinching and kneading the parison, and can pinch closed a fabrication hole left after the lifting apparatus is lowered. In this process, the temperature of the parison is over 140° C., the parison is in a molten state and has a relatively good fusion-weld strength after being pinched and kneaded.

A second bottom slider can also be disposed below the first bottom slider, and the second bottom slider needs to advance in place before mold clamping.

In step 1), the built-in component is mounted to the lifting apparatus, and the built-in component includes one or more fuel tank built-in components such as a baffle and a valve pipe assembly.

In step 1), the built-in component is mounted to the lifting apparatus, the lifting apparatus not only has ascending and descending functions, but also has a lateral movement function, and can move to the outside of the mold by using a lateral movement mechanism after descending to be below the mold, to complete the step of mounting the built-in component to the lifting apparatus in step 1) in advance in the process of the high-pressure blowing in the mold.

The lateral movement function can implement movement of the entire or a part of the lifting apparatus in a direction perpendicular to a mold closing direction, the lateral movement mechanism consists of a guide rail and the driving apparatus, and the driving apparatus is one or more of conventional drives such as a hydraulic cylinder, a pneumatic cylinder, and a servo motor.

Compared with the prior art, the present invention has the following advantages: 1) the hollow body forming mold designed in this technical solution has a compact and delicate structure, and can resolve, without lengthening the forming period, the difficult technical problem that a fabrication hole exists during forming, by using a conventional technology, of a hollow body with a built-in component, and has the advantage of reducing emission; 2) according to the hollow body forming method described in this technical solution, the mold is closed in place at one time and does not need to be closed in two steps, and the method has the advantages that the combination between the built-in component and an inner wall of an fuel tank is relatively good, and the stability of the location is high; 3) according to the hollow body forming method used in this technical solution, in the process of the high-pressure blowing in the mold, the lifting apparatus is lowered to be below the mold, and the lifting apparatus does not need to be lowered to be below the mold before the mold is closed in place or after the mold is opened, so that the descending time of the lifting apparatus is reduced, and the method has the advantages of a short forming period and the high production efficiency; and 4) according to the hollow body forming method described in this technical solution, there is no formed fabrication hole, and a subsequent working procedure of welding a "cap" for sealing does not need to be added, and the method has the advantages of reducing device and personnel costs brought by the welding working procedure.

DETAILED DESCRIPTION

To deepen the understanding of the present invention, this embodiment is described in detail below with reference to the accompanying drawings.

For purposes of the description hereinafter, the terms "upper", "lower", "right", "left", "vertical", "horizontal", "top", "bottom", "lateral", "longitudinal", and derivatives thereof, shall relate to the disclosed apparatus as it is oriented in the figures. However, it is to be understood that the apparatus of the present disclosure may assume alternative variations and step sequences, except where expressly specified to the contrary. It is also to be understood that the specific systems and processes illustrated in the attached drawings, and described in the following specification, are simply exemplary examples of the apparatus disclosed herein. Hence, specific dimensions and other physical characteristics related to the examples disclosed herein are not to be considered as limiting.

Figure 1:
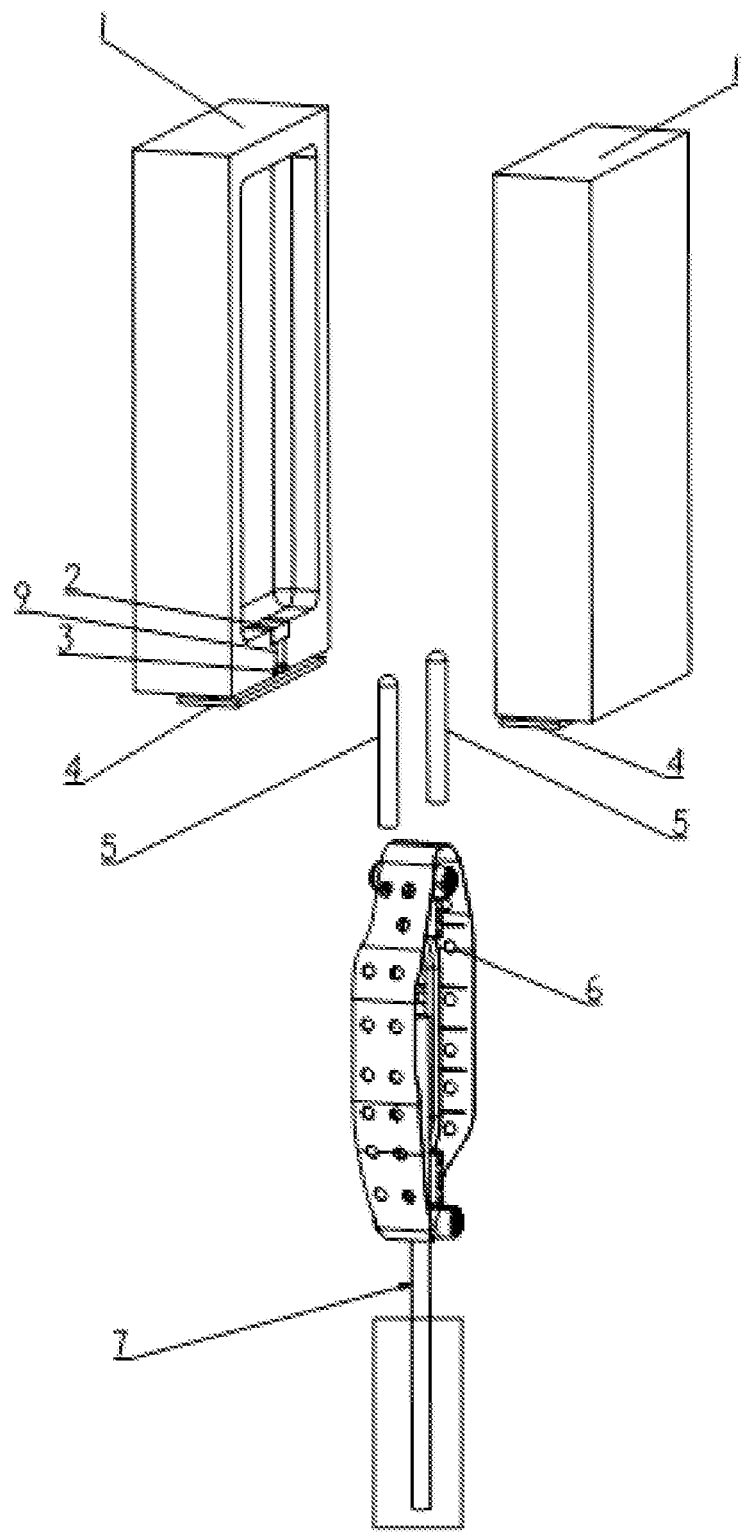
FIG. 1 is a perspective view of an assembly performing a step 1) of a process.
Figure 2:
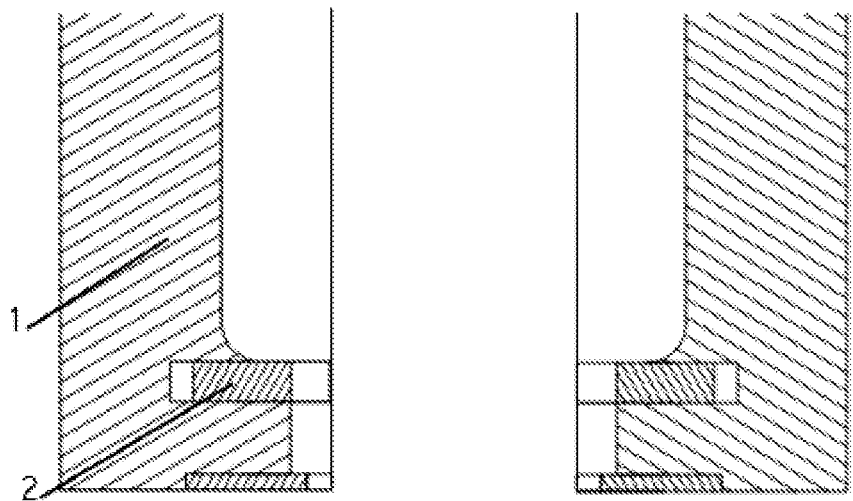
FIG. 2 is a cross-sectional view of the mold of FIG. 1 showing that the mold is in an open state and a first bottom slider is located at a draw-back location.
Figure 3:
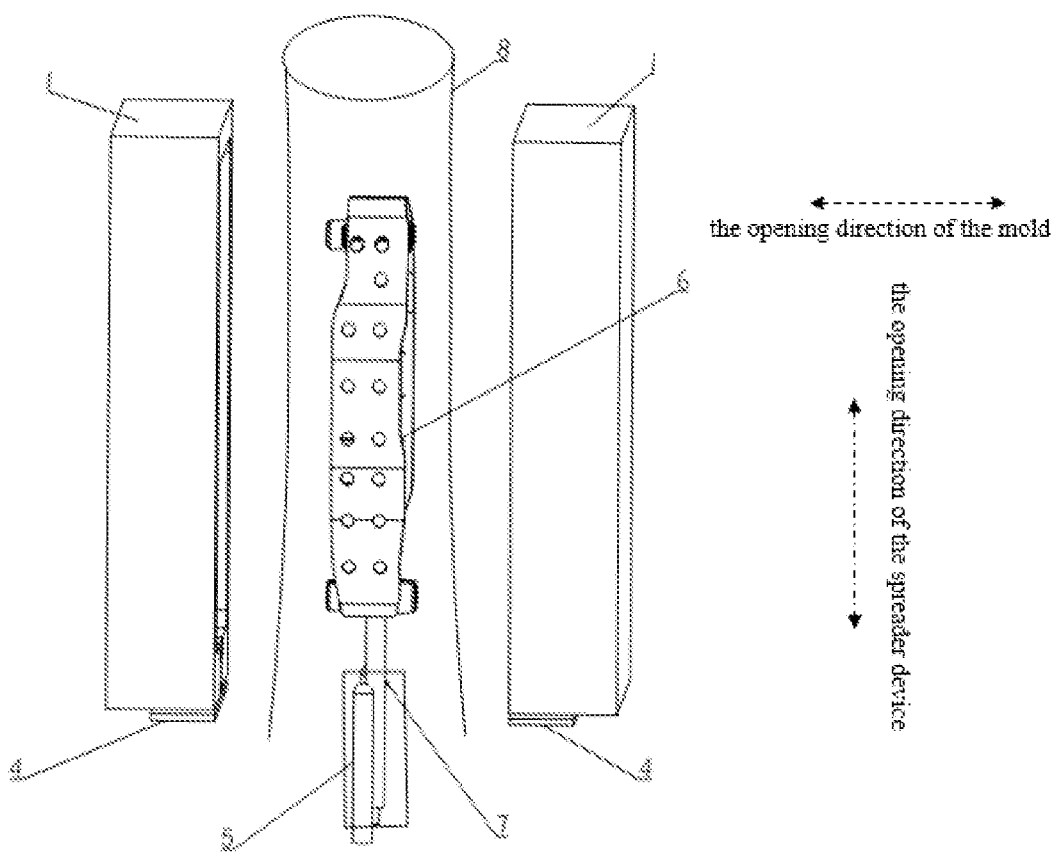
FIG. 3 is a perspective view of an assembly performing a step 3) of a process.
Figure 4:
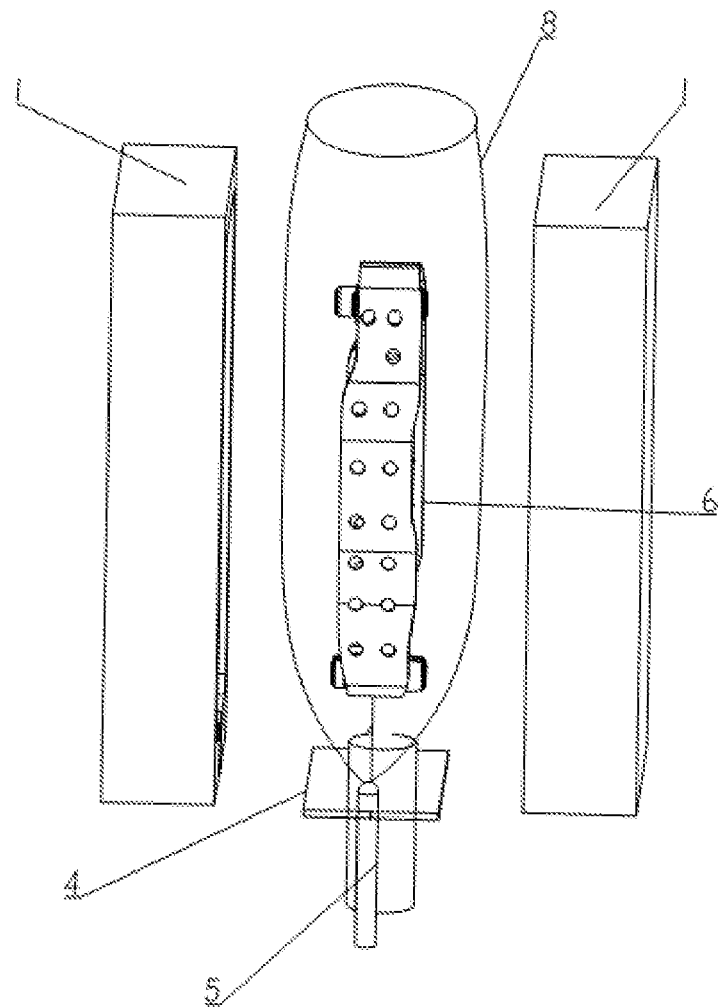
FIG. 4 is a perspective view of an assembly performing a step 6) of a process schematic diagram of a process of step 6)
Figure 5:
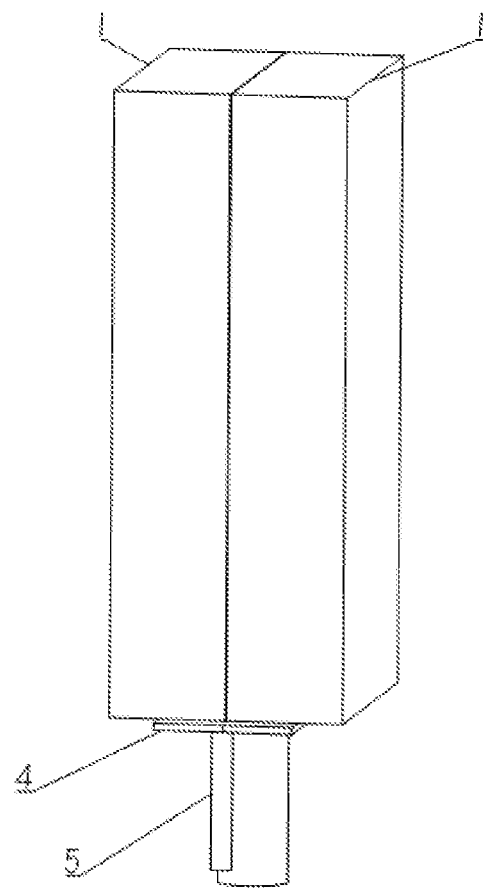
FIG. 5 is a perspective view of an assembly performing a step 7) of a process schematic diagram of a process of step 7)
Figure 6:
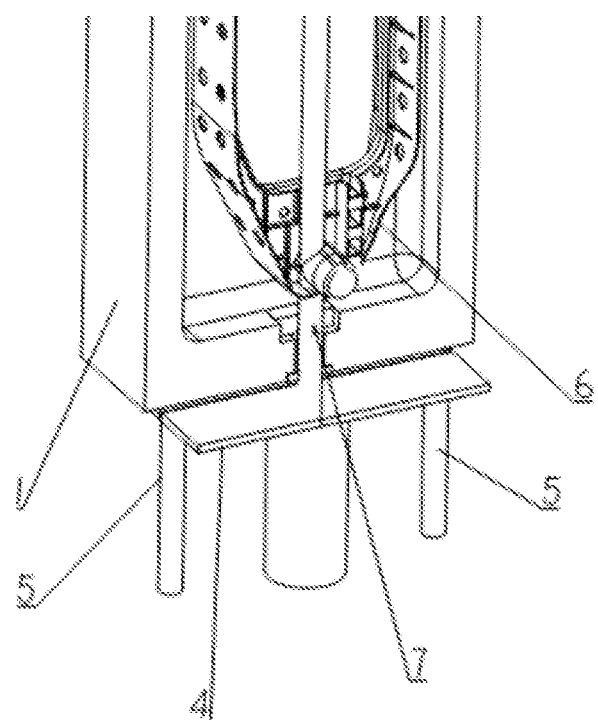
FIG. 6 is a perspective partial view of an internal status of a mold after the mold is closed in place in the step 7)
Figure 7:
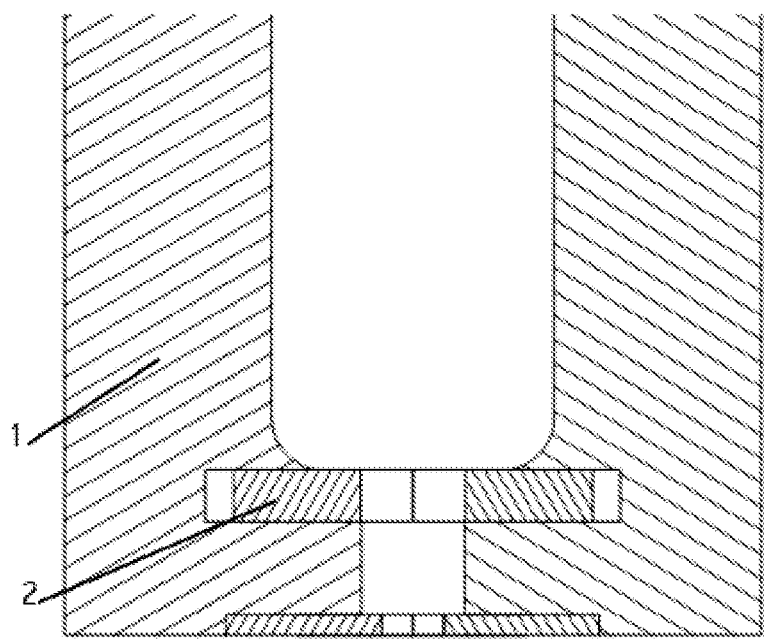
FIG. 7 is a cross-sectional view showing that the mold is in a closed state and a first bottom slider is located at a draw-back location.
Figure 8:
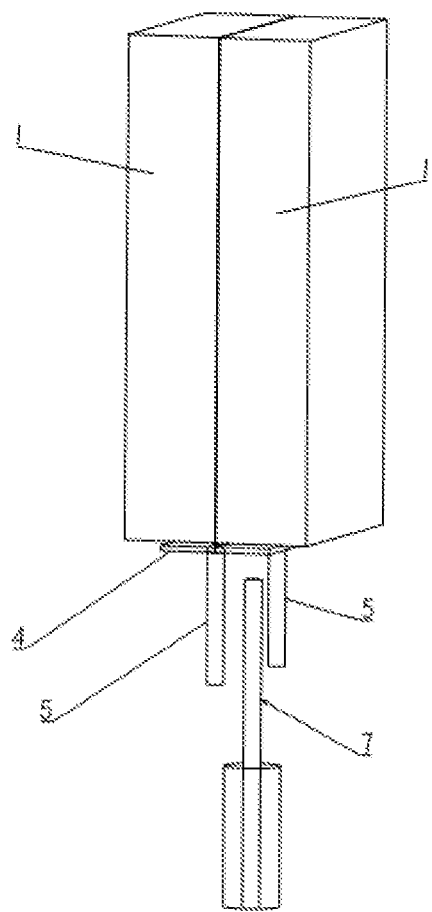
FIG. 8 is a perspective view of an assembly performing a step 8) of a process.
Figure 9:
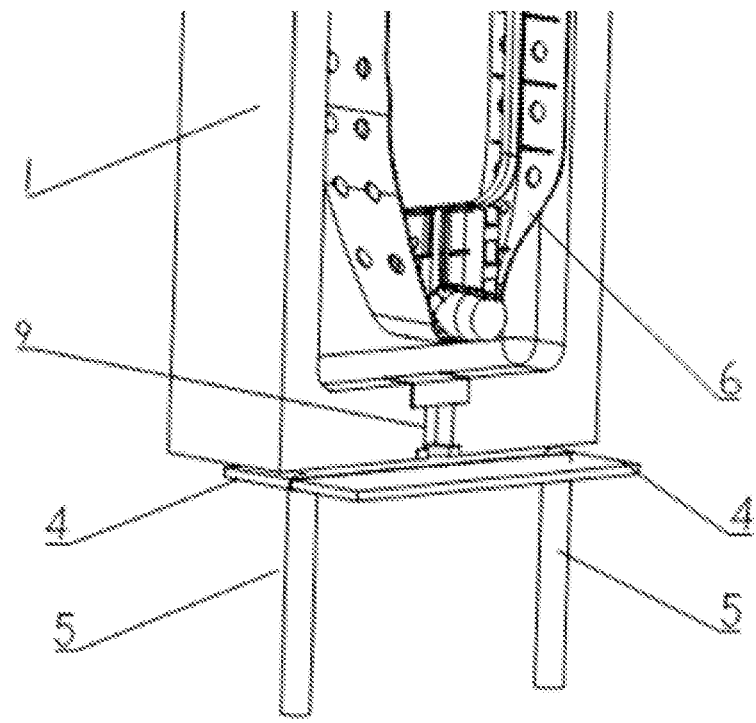
FIG. 9 is a perspective partial view of an internal status of a the mold after a first bottom slider advances in place in the step 9)
Figure 10:
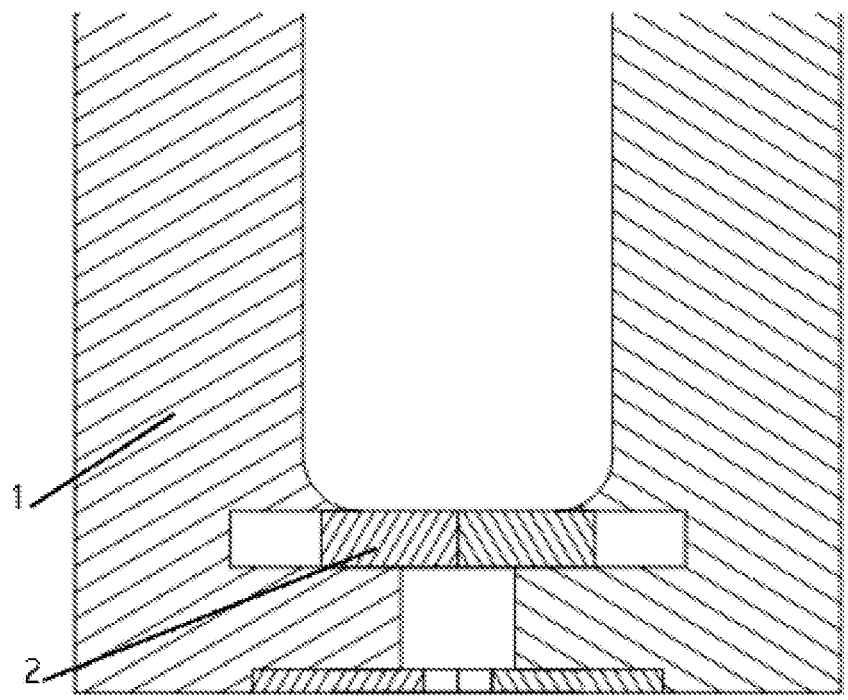
FIG. 10 is a cross-sectional view showing that a mold is in a closed state and a first bottom slider is located at an advancing location.

Embodiment 1: Referring to FIG. 1 to FIG. 10, a hollow body forming mold is provided. The forming mold includes left and right half molds 1, a bottom of the left half mold 1 is provided with a left avoidance slot 9, a bottom of the right half mold 1 is provided with a right avoidance slot 9, a left bottom slider is disposed in the left avoidance slot 9, a right bottom slider is disposed in the right avoidance slot 9, and the left and right bottom sliders constitute a group of sliders.

The left and right avoidance slots 9 are symmetrically distributed and have a same width, and the left and right bottom sliders are symmetrically distributed and have a same width.

The left or right bottom slider is a part that constitutes a bottom pinch line of the left or right half mold 1.

There is only one left or right avoidance slot 9.

There is at least one left bottom slider and at least one right bottom slider, and only one left bottom slider and one right bottom slider are a part that constitutes a bottom pinch line, the group of sliders is referred to as a first bottom slider 2, and remaining slider groups can be arranged below the first bottom slider.

The left and right bottom sliders are respectively connected to the left and right half molds of the mold 1 by using a driving apparatus, and the driving apparatus is usually any one of conventional drives such as a hydraulic cylinder, a pneumatic cylinder, and a servo motor.

Embodiment 2: Referring to FIG. 1 to FIG. 10, a hollow body forming method is shown. The method includes the following steps:
- step 1) mounting a built-in component 6 to a lifting apparatus 7;
- step 2) blanking a parison 8 to a specified location;
- step 3) delivering, by the lifting apparatus 7, a baffle 6 into a molten cylindrical parison 8, where a location at which the lifting apparatus 7 enters the parison 8 is determined based on a location of connection between a built-in component 6 and an fuel tank housing in a product design, and may vary in different products;
- step 4) opening a spreader device 5 to expand the parison 8, where an opening direction is perpendicular to a mold 1 closing direction;
- step 5) closing a parison closing device 4 to seal the parison 8, where a closing direction is the same as the mold 1 closing direction;
- step 6) performing preblowing;
- step 7) closing a mold 1;
- step 8) after the mold 1 is closed in place, lowering the lifting apparatus 7 to outside of the mold 1;
- step 9) driving, by a driving apparatus, a first bottom slider 2 of the mold 1 to advance in place, where the first bottom slider 2 is a constituent part of a lower pinch line of the mold 1, and the first bottom slider 2 is integrated with the lower pinch line of the mold 1 after advancing in place;
- step 10) performing high-pressure blowing in the mold 1;
- step 11) after the high-pressure blowing ends, opening the mold 1, and drawing the first bottom slider 2 of the mold back; and
- step 12) taking, by a mechanical hand, a product out.

Figure 11:
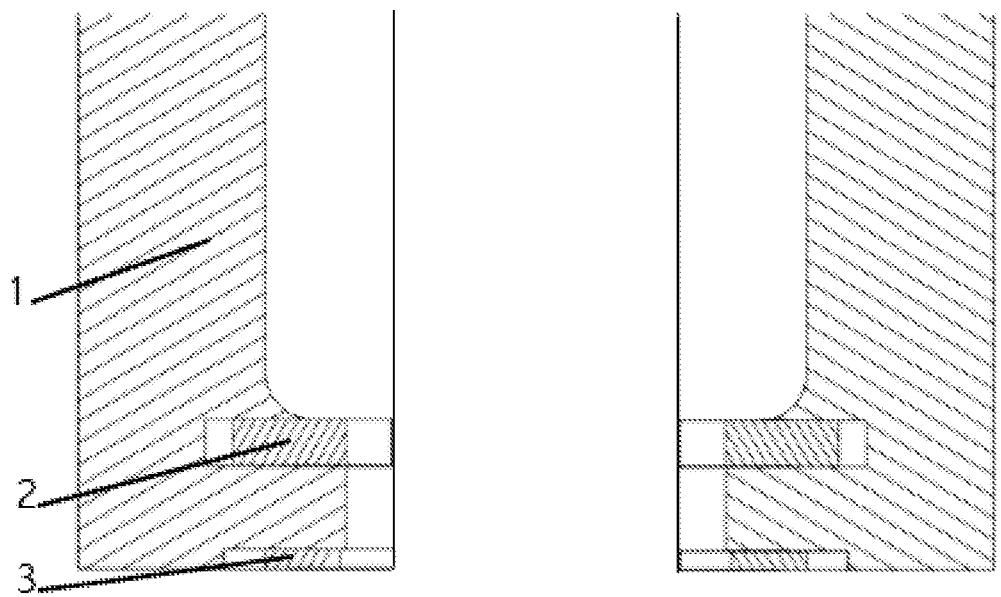
FIG. 11 is a cross-sectional view showing that a bottom of a mold is provided with a second bottom slider, the mold is in an open state and both a first bottom slider and the second bottom slider are located at a draw-back location.
Figure 12:
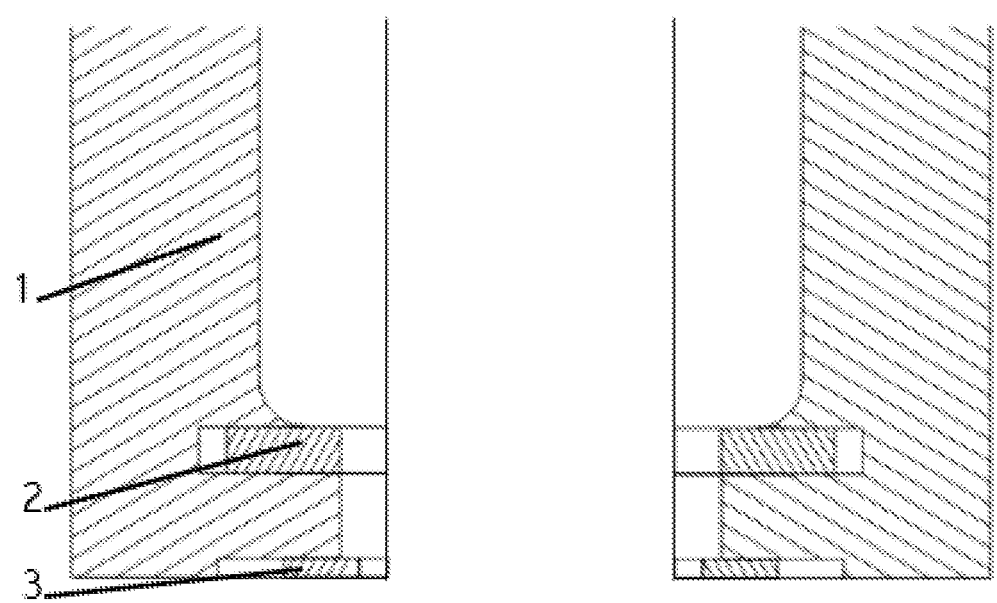
FIG. 12 is a cross-sectional view showing that a bottom of a mold is provided with a second bottom slider, the mold is in an open state, a first bottom slider is located at a draw-back location and the second bottom slider is located at an advancing location.
Figure 13:
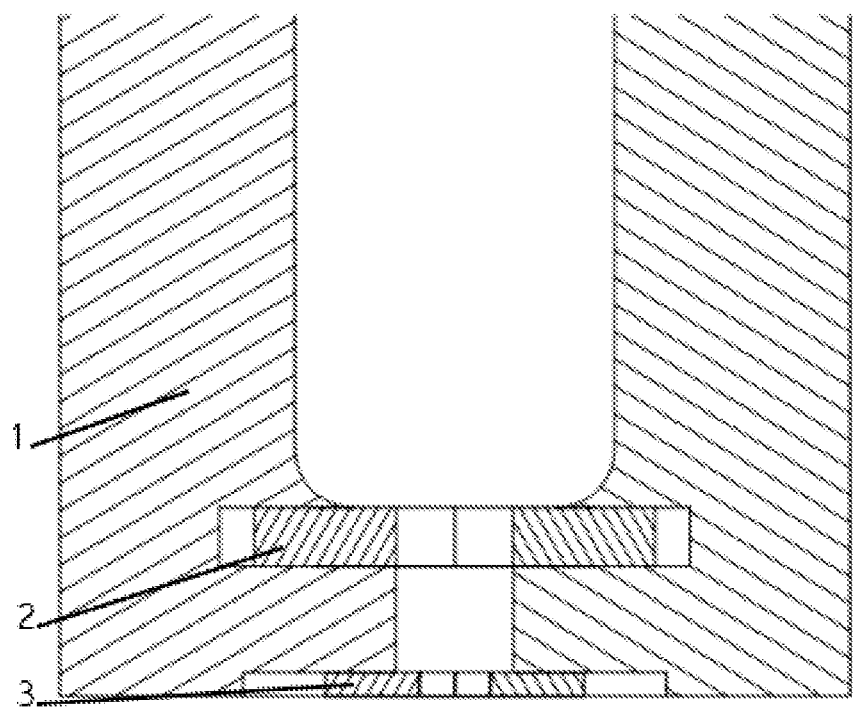
FIG. 13 is a cross-sectional view showing that a bottom of a mold is provided with a second bottom slider, the mold is in a closed state, a first bottom slider is located at a draw-back location and the second bottom slider is located at an advancing location.
Figure 14:
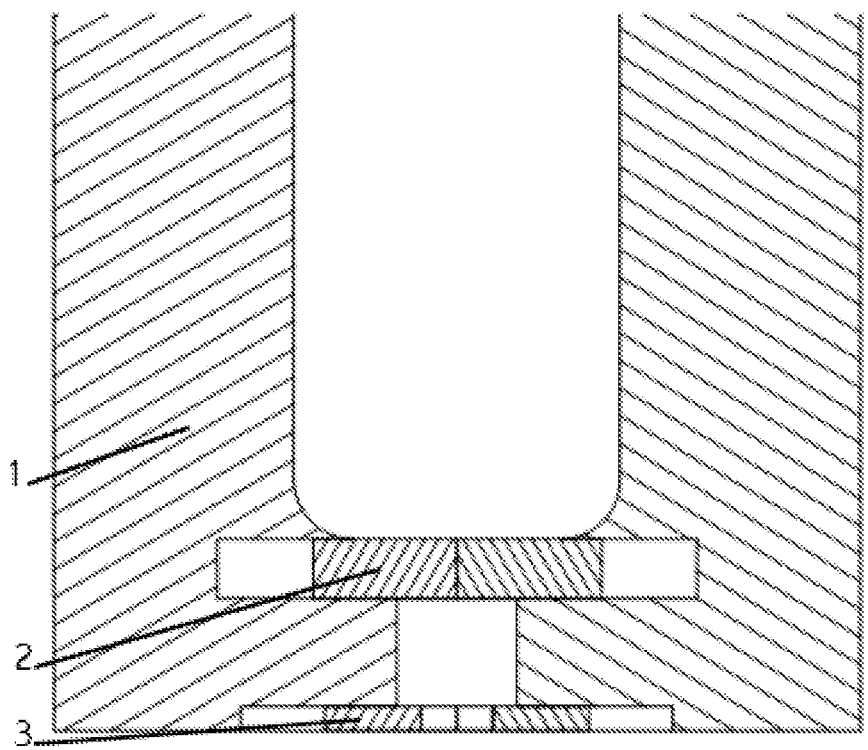
FIG. 14 is a cross-sectional view showing that a bottom of a mold is provided with a second bottom slider, the mold is in a closed state and both a first bottom slider and the second bottom slider are located at an advancing location.

Embodiment 3: Referring to FIG. 1 to FIG. 14, a hollow body forming method is shown. The method includes the following steps:
- step 1) mounting a built-in component 6 to a lifting apparatus 7;
- step 2) blanking a parison 8 to a specified location;
- step 3) delivering, by the lifting apparatus 7, a baffle 6 into a molten cylindrical parison 8, where a location at which the lifting apparatus 7 enters the parison 8 is determined based on a location of connection between a built-in component 6 and an fuel tank housing in a product design, and may vary in different products;
- step 4) opening a spreader device 5 to expand the parison 8, where an opening direction is perpendicular to a mold 1 closing direction;
- step 5) closing a parison closing device 4 to seal the parison 8, where a closing direction is the same as the mold 1 closing direction;
- step 6) performing preblowing;
- step 7) causing a second bottom slider 3 to advance in place, and closing a mold 1;
- step 8) after the mold 1 is closed in place, lowering the lifting apparatus 7 to outside of the mold 1;
- step 9) driving, by a driving apparatus, a first bottom slider 2 of the mold to advance in place, where the first bottom slider 2 is a constituent part of a lower pinch line of the mold 1, and the first bottom slider 2 is integrated with the lower pinch line of the mold 1 after advancing in place;
- step 10) performing high-pressure blowing in the mold 1;
- step 11) after the high-pressure blowing ends, opening the mold 1, and drawing the first bottom slider 2 of the mold back; and
- step 12) taking, by a mechanical hand, a product out.

Embodiment 4: Referring to FIG. 1 to FIG. 10, in the step 1), the built-in component 6 is mounted to the lifting apparatus 7, the lifting apparatus 7 not only has ascending and descending functions, but also has a lateral movement function, and can move to the outside of the mold 1 by using a lateral movement mechanism after descending to be below the mold, to complete the step of mounting the built-in component 6 in advance in the process of the high-pressure blowing in the mold 1, and the lateral movement function can implement movement of the entire or a part of the lifting apparatus 7 in a direction perpendicular to a mold 1 closing direction. The function is implemented by using a guide rail and the driving apparatus. The driving apparatus is any one of conventional drives such as a hydraulic cylinder, a pneumatic cylinder, and a servo motor. By using this method, a forming period can be shortened and the forming efficiency can be improved. The remaining steps are the same as those in Embodiment 2 or 3.

While several examples of the invention were shown in the accompanying figures and described in detail hereinabove, other examples will be apparent to, and readily made by, those skilled in the art without departing from the scope and spirit of the disclosure. Accordingly, the foregoing description is intended to be illustrative rather than restrictive. The apparatus of the present disclosure described hereinabove is defined by the appended claims and all changes to the disclosed apparatus that fall within the meaning and range of equivalency of the claims are to be embraced within their scope.

The invention claimed is:

1. A hollow body forming mold, wherein the forming mold comprises:
   left and right half molds,
   a left avoidance slot provided in a bottom of the left half mold,
   a right avoidance slot provide in a bottom of the right half mold,
   a left bottom slider disposed in the left avoidance slot, and a right bottom slider disposed in the right avoidance slot, wherein the left and right bottom sliders each comprise at least two sliders provided in the bottom of the respective left and right half molds.

2. The hollow body forming mold according to claim 1, wherein the left and right avoidance slots are symmetrically distributed and have a same width, and the left and right bottom sliders are symmetrically distributed and have a same width.

3. The hollow body forming mold according to claim 1, wherein the left or right bottom slider is configured as a bottom pinch line of the left or right half mold, and there is only one left or right avoidance slot.

4. The hollow body forming mold according to claim 1, wherein there is at least one left bottom slider and at least one right bottom slider, and only one left bottom slider and one right bottom slider is configured as a bottom pinch line, the group of sliders is referred to as a first bottom slider, and any further slider groups can be arranged below the first bottom slider.

5. The hollow body forming mold according to claim 1, wherein the left and right bottom sliders are respectively connected to the left and right half molds of the mold by using a driving apparatus, and the driving apparatus is usually any one of conventional drives such as a hydraulic cylinder, a pneumatic cylinder, and a servo motor.

\* \* \* \* \*